United States Patent [19]

Dixon

[11] 4,351,637
[45] Sep. 28, 1982

[54] PRECISION CHAIN DRIVE

[75] Inventor: Paul H. Dixon, Belvidere, Ill.

[73] Assignee: Dixon Automatic Tool, Inc., Rockford, Ill.

[21] Appl. No.: 144,591

[22] Filed: Apr. 28, 1980

[51] Int. Cl.³ .................................................. B65G 21/20
[52] U.S. Cl. ...................................... 474/148; 198/838
[58] Field of Search ............... 474/148, 149, 150, 901; 198/838, 845; 305/24, 25

[56] References Cited

U.S. PATENT DOCUMENTS 1,724,908  8/1929  Comstock .................... 198/838 X

FOREIGN PATENT DOCUMENTS 1180312  10/1964  Fed. Rep. of Germany ...... 198/838
1471523  4/1973  United Kingdom .

Primary Examiner—C. J. Husar
Assistant Examiner—Conrad Berman
Attorney, Agent, or Firm—Leydig, Voit, Osann, Mayer & Holt, Ltd.

[57] ABSTRACT

A precision roller chain with parallel runs and with an even number of links is trained around a sprocket wheel and an idler wheel and is driven around a racetrack-shaped path. To compensate for the inherent tendency of the chain to tighten and loosen in a cyclic manner, the idler wheel is formed with a smooth periphery and has a somewhat smaller diameter than the effective diameter of the sprocket wheel. In addition, compensating ramps hold the chain outwardly away from the idler wheel adjacent the tangency points of the idler wheel and keep the chain tight when the rollers of the chain are in angular positions which otherwise would cause the chain to inherently loosen.

4 Claims, 4 Drawing Figures

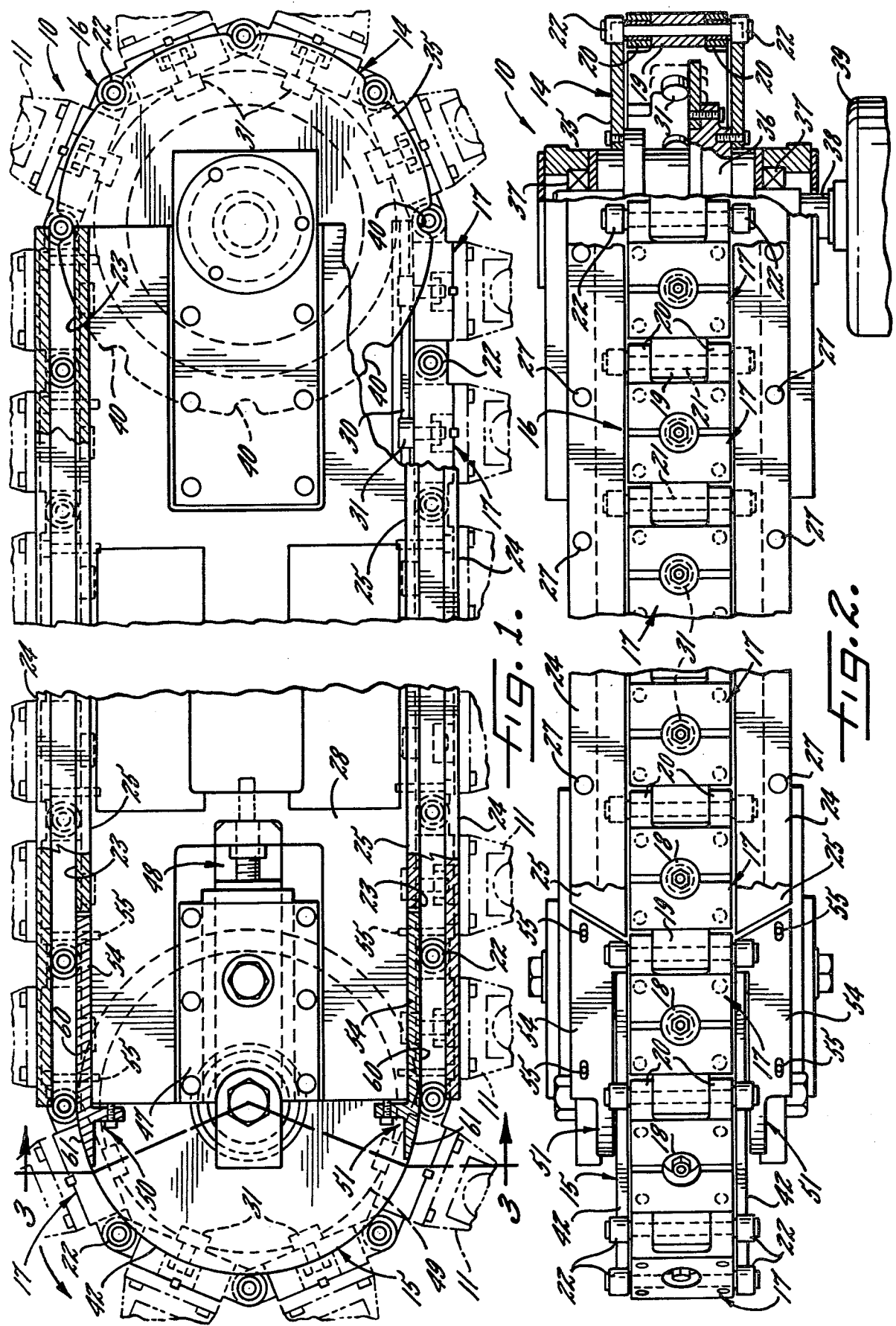

PRECISION CHAIN DRIVE

BACKGROUND OF THE INVENTION

This invention relates to a precision chain drive of the type in which a roller chain is trained around and tensioned between a pair of rotatable wheels and is advanced around a racetrack-shaped path when one of the wheels is driven. The driven wheel is in the form of a sprocket wheel while the other wheel is an idler. A chain of this type sometimes is driven intermittently and carries fixtures which dwell at successive work stations when the chain stops.

Precision roller chains which have an even number of links inherently present a problem when an attempt is made to tension the chain between a sprocket wheel and an idler wheel and to keep the two straight runs of the chain parallel to one another. That is, the chain tends to become tight when the links are in one angular position relative to the wheels and then tends to loosen when the links advance to a different angular position. The cyclic tightening the loosening inherently occurs as the links approach and recede away from the points at which the runs of the chain become tangent to the wheels.

To provide a precision chain drive, compensation must be made for the cyclic tightening and loosening of the chain. Without compensation, the chain, when in its naturally tightest position, will break if the spacing between the two wheels is sufficiently great to keep the chain tight when the chain is in its naturally loosest position. Conversely, if the spacing between the wheels is sufficiently small to prevent breakage of the chain when the chain is in its naturally tightest position, the chain will be loose and imprecise when in its naturally loosest position.

One way of attempting to compensate for the cyclic tightening and loosening of the chain is to guide the rollers of the chain such that the rollers move along an angled path as the rollers approach and recede from the wheels. This approach, however, still does not enable the chain to be extremely tight and, perhaps even more detrimentally, causes the rollers to impact against the guide means and the wheels. This results in noise and abrupt shock loads and particularly when heavy fixtures are carried by the chain.

A second compensation method involves the use of a wheel which is spring loaded so that it can automatically move toward and away from the other wheel and change the effective center distance between the wheels to accommodate the cyclic tightening and loosening of the chain. This method, however, also is unsatisfactory from the standpoint that it requires repetitive movement of the mass of the spring loaded wheel and produces noise and shock loads.

SUMMARY OF THE INVENTION

The general aim of the present invention is to provide a new and improved precision roller chain drive in which the straight runs of the chain travel in parallel paths and in which compensation for the cyclic tightening and loosening of the chain is effected in a unique manner enabling the chain to run smoothly, quietly and without impacting against the wheels or the chain guides.

A more detailed object of the invention is to achieve the foregoing by providing a roller chain in which the straight runs travel in parallel paths and in which the diameter of the idler wheel is somewhat smaller than the effective diameter of the sprocket wheel in order to prevent breakage of the chain when the chain is in its naturally tightest position. To keep the straight runs of the chain parallel and to keep the chain tight when the chain is in its naturally loosest position, unique ramps are located in the vicinity of the area where the rollers approach and recede from the idler wheel and such ramps tighten the chain to prevent the chain from cycling to its naturally loosest position.

The invention also resides in the novel shape and location of the compensating ramps to enable the rollers and links to travel in straight paths as the rollers approach and recede from the idler wheel and to guide the rollers smoothly into and out of engagement with the idler wheel.

These and other objects and advantages of the invention will become more apparent from the following detailed description when taken in conjunction with the accompanying drawings.

BRIEF DESCRIPTION OF THE DRAWINGS

FIG. 1 is a fragmentary top plan view of a new and improved precision chain drive incorporating the unique features of the present invention.

FIG. 2 is a fragmentary side elevational view of the chain drive shown in FIG. 1.

DETAILED DESCRIPTION OF THE PREFERRED EMBODIMENT

Figure 3:
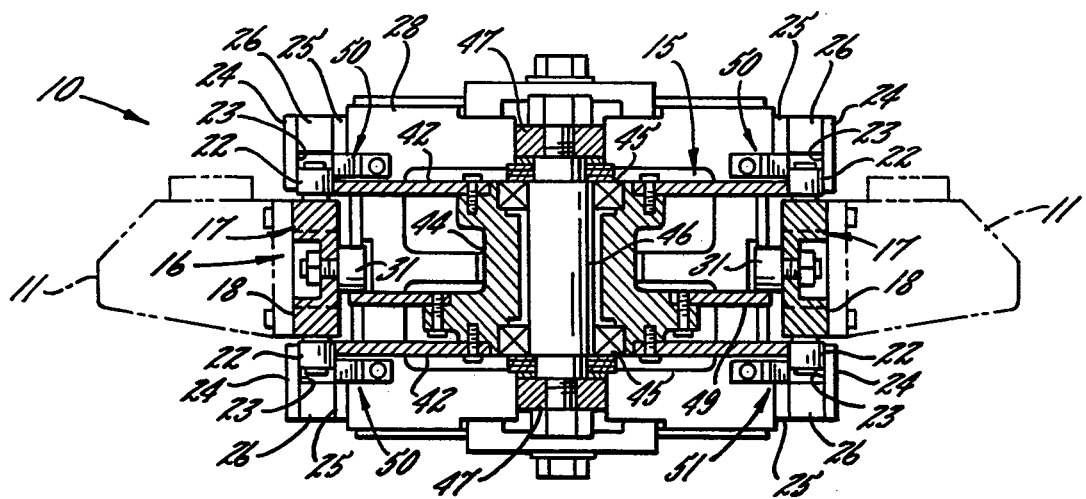
FIG. 3 is a fragmentary cross-section taken substantially along the line 3—3 of FIG. 1.

As shown in the drawings for purposes of illustration, the invention is embodied in a precision chain drive 10 which is used to advance a series of equally spaced workpiece-holding fixtures 11 through successive work stations. In this particular instance, the drive is of the intermittent type and thus the fixtures periodically dwell in the stations while operations (e.g., assembly operations) are performed on workpieces (not shown) which are held by the fixtures.

In general, the drive 10 comprises a sprocket wheel 14 and an idler wheel 15 adapted to rotate about horizontally spaced and vertically extending axes. A precision roller chain 16 is trained around and is tensioned between the two wheels and advances counterclockwise around a racetrack-shaped path when the sprocket wheel is driven. The chain is formed by an even number of pivotally interconnected links 17. Each link comprises a rather massive metal body 18 (FIG. 2) having a tongue 19 projecting from its trailing end and having a pair of vertically spaced ears 20 projecting from its leading end. The tongue of each link projects between the ears of the adjacent trailing link and is pivotally connected thereto by a vertical pivot pin 21 which extends through the tongue and the ears. The fixtures 11 are rigidly attached to the bodies 18 of the links 17.

Figure 4:
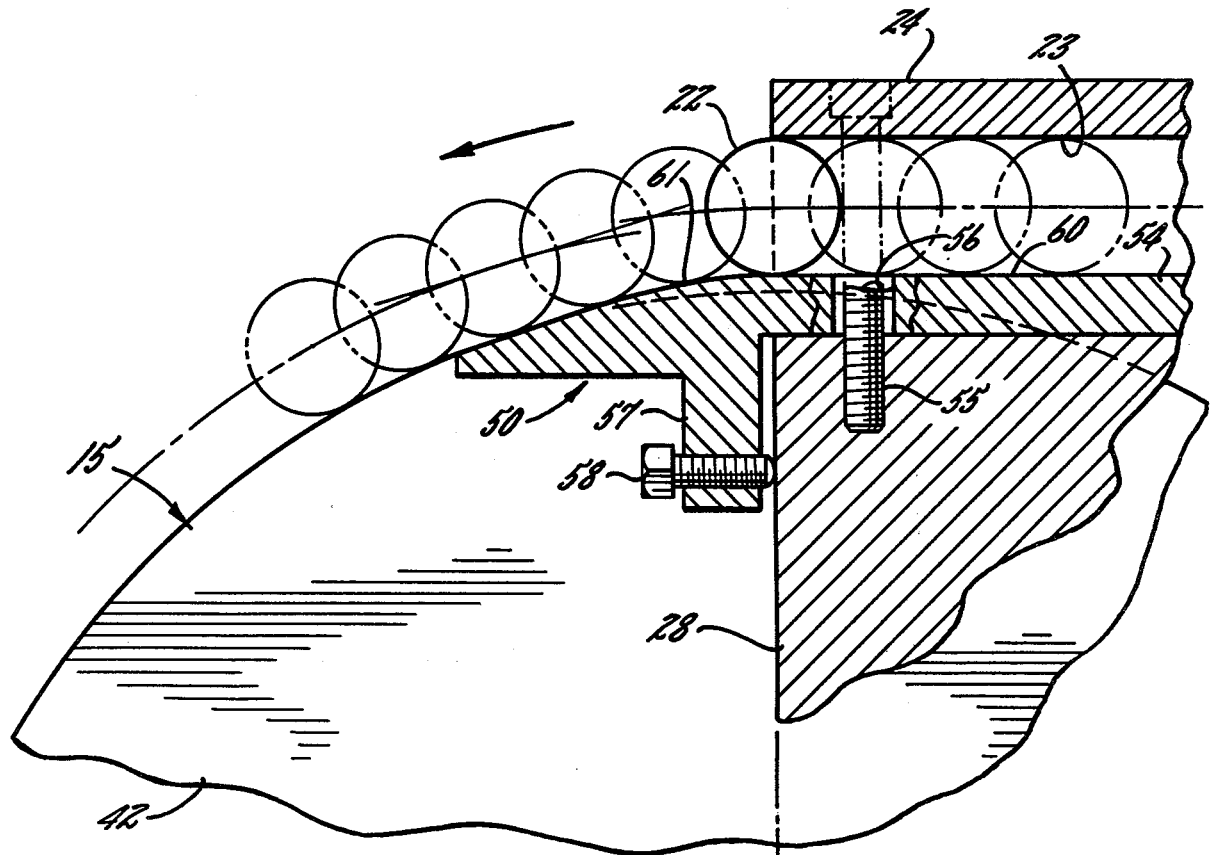
FIG. 4 is an enlarged fragmentary sectional view of parts shown in FIG. 1.

Rollers 22 are rotatably mounted on the upper and lower ends of each pivot pin 21 and are adapted to ride within upper and lower guide channels 23 (FIGS. 1, 3 and 4) as the fixtures 11 move in straight paths along the front and rear sides of the drive 10. Each of the four guide channels is defined by the inboard surface of an outboard rail 24 and by the outboard surface of an inboard rail 25, the two rails being separated by a spacer 26 (FIG. 3). Screws 27 located above and below the elevation of the upper and lower rollers 22 extend through the rails and the spacers and fasten the rails and the spacers securely to a stationary main support or frame 28 which is located between the wheels 14 and 15. The rollers 22 engage the rails 24 and 25 and are confined closely within the channels 23 so as to prevent any lateral movement of the chain 16 and to keep the two runs of the chain parallel to one another between the wheels 14 and 15.

Horizontal tracks 30 (FIG. 1) are fastened to the frame 28 adjacent the inboard rails 25 and engage rollers 31 which are mounted on and project inwardly from the bodies 18 of the links 17, the rollers 31 being mounted to turn about horizontal axes. The chain 16 is prevented from sagging downwardly by virtue of the rollers 31 engaging the tracks 30. Accordingly, the rollers 22 and the rollers 31 keep the chain 16 running along a precisely defined path.

In the present instance, the sprocket wheel 14 is defined by a pair of vertically spaced discs 35 (FIG. 2) which are secured to a central hub 36. The latter is rotatably supported by bearings 37 mounted on the frame 28 and is keyed to the upright output shaft 38 of a drive unit 39. The shaft is adapted to be rotated intermittently by the drive unit and thus the discs 35 of the sprocket 14 are rotated with a step-by-step motion.

Angularly spaced and vertically alined pockets 40 (FIG. 1) are formed in the two discs 35 of the sprocket 14 and are adapted to receive the upper and lower rollers 22 of the chain 16. The angular spacing or pitch of the pockets is equal to the pitch of the pivot pins 21. When the sprockets are rotated, successive rollers 22 leave the front guide channel 23 and enter successive pockets 40 as the rollers approach the point where the chain becomes tangent to the sprocket. The rollers are carried around in the pockets by the sprocket to drive the chain and then move out of the pockets and into the rear guide channel 23. As the fixtures 11 move around the sprocket 14, the bodies 18 of the links 17 extend chordwise between the discs 35 of the sprocket. In addition, the rollers 31 (FIG. 2) are supported by a circular plate 41 which is secured to the hub 36 and which is located between the discs 35.

The idler wheel 15 also is defined by a pair of vertically spaced discs 42 (FIG. 3). These discs are fastened to a hub 44 which, in turn, is journaled by bearings 45 on a stationary shaft 46 supported by a mounting bracket 47 (FIG. 1). Mechanism indicated generally by the reference numeral 48 in FIG. 1 connects the mounting bracket to the frame 28 and may be adjusted manually to change the horizontal spacing between the wheels 14 and 15 and thus establish the proper tension in the chain 16.

As the fixtures 11 move around the idler wheel 15, the bodies 18 of the links 17 are located between the discs 42 and extend chordwise thereof. The rollers 31 are supported by a circular disc 49 (FIG. 3) which is secured to the hub 44.

A precision roller chain having an even number of links and having parallel runs inherently tends to loosen and tighten in a cyclic manner when the chain is trained around and is tensioned tightly between sprocket and idler wheels of equal diameter. When diametrically spaced pivot pins of the chain are located at twelve o'clock and six o'clock points on the wheels as shown in FIG. 1, the geometrical relationship between the wheels and the chain links is such that the chain is in its naturally loosest condition. As the same pivot pins move away from the twelve and six o'clock points, the change in geometrical relationship between the chain links and the wheels inherently causes the chain to tighten. The chain assumes its naturally tightest position when the leading and trailing pivot pins of one given link are located about equidistantly on opposite sides of the twelve o'clock point and when the leading and trailing pivot pins of the generally opposite link are located about equidistantly on opposite sides of the six o'clock point. It is recognized in the art that the inherent tendency of a precision chain to tighten and loosen in a cyclic manner requires compensation in order to keep the chain tight when the chain is in its naturally loosest condition but, at the same time, to prevent the chain from binding or breaking when the chain is in its naturally tightest condition.

The present invention contemplates the provision of an extremely simple system which effectively compensates for the tendency of the chain 16 to tighten and loosen, which achieves such compensation without imparting shock loads on the chain or the wheels 14 and 15, and which enables the chain to run in a substantially silent manner and with far less noise than is the case with compensating arrangements which have been used previously. Moreover, the compensation is achieved in a manner which permits the rollers 22 to approach and recede from the wheels along straight paths so as to enable a smooth and substantially noiseless transition when the rollers leave and enter the guide channels 23.

In carrying out the invention, the peripheries of the discs 42 of the idler wheel 15 are smooth and continuous rather than being formed with pockets like the pockets 40 of the discs 35 of the sprocket wheel 14. Moreover, the diameter of the discs 42 of the idler wheel 15 is somewhat less than the effective diameter of the discs 35 of the sprocket wheel 14. That is to say, the diameter of each disc 42 is less than the effective bottom diameter (i.e., the distance between the bottoms of two diametrically opposed pockets 40) of each disc 35. In one particular instance where the chain includes 132 links of pitch P, the effective diameter of the idler wheel is about 2.54 P, the effective diameter of the sprocket wheel with eight pockets is about 2.61 P and the center-to-center spacing between the two wheels is about 62.05 P.

Further in carrying out the invention, novel means are provided adjacent the areas of the tangent points of the idler wheel 15 to increase the effective diameter of the idler wheel in those areas and keep the chain 16 tight in spite of the reduced actual diameter of the idler wheel. Herein, these means comprise plate-like ramps 50 and 51 which are secured to the frame 28 and which engage the rollers 22 as the rollers move between the guide channels 23 and the idler wheel 15.

More specifically, two ramps 50 are located adjacent the idler wheel 15 along the rear side of the drive 10, there being one ramp just above the upper disc 42 and there being a second ramp just below the lower disc 42. Two additional ramps 51 are located above and below the upper and lower discs 42 adjacent the front of the drive 10. Each ramp comprises a plate 54 (FIGS. 2 and 4) which forms a continuation of the adjacent inboard guide rail 25. Screws 55 (FIG. 4) extend through the outboard rail 24, through the spacer 26, through longitudinally elongated slots 56 in the plate 54 and are threaded into the frame 28. The screws 55 clamp the outboard rail to the spacer, clamp the spacer to the plate and clamp the plate to the frame but can be loosened to enable longitudinal adjustment of the ramp 50, 51, relative to the frame as permitted by the elongated slots 56. Each ramp includes an inwardly projecting tongue 57 (FIG. 4) which extends alongside the end of the frame. A set screw 58 is threaded into the tongue and bears against the end of the frame. The set screw is tightened or loosened whenever the ramp is longitudinally adjusted. The ramps thus can be set in the proper position relative to the idler wheel 15 and, if the position of the idler wheel is changed by the mechanism 48, the ramps can be adjusted in accordance with the new position of the wheel.

The outboard side 60 (FIG. 4) of the plate 54 of each ramp 50, 51 is straight and is directly in line with the outboard side of the adjacent inboard rail 25 so that the rollers 22 of the chain 16 continue to be guided along a straight path as they move between the rail and the plate. Importantly and in keeping with the invention, the outboard sides 60 of the plates 54 of the ramps extend parallel to and are located outwardly of lines which are tangent to the idler wheel 15 at the twelve and six o'clock points of the idler wheel. Thus, the surfaces 60 hold the rollers 22 away from the wheel 15 at those points.

As each ramp 50 progresses counterclockwise from the twelve o'clock point of the idler wheel 15, its outer side is formed with a cam surface 61 (FIG. 4) which gradually curves inwardly toward the periphery of the wheel 15 and which ultimately coincides with the arc of the wheel. As each ramp 51 progresses counterclockwise toward the six o'clock point, its outer side is formed with a curved cam surface which initially coincides with the arc of the wheel 15, which gradually curves outwardly away from the periphery of the wheel prior to reaching the six o'clock point and which thereafter merges with the straight outer side 60 of the plate 54.

With the foregoing arrangement, each roller 22 advancing toward the twelve o'clock point on the idler wheel 15 leaves the inner guide rail 25 and moves onto the straight surface 60 of the plate 54 of the ramp 50. When the roller 22 reaches the twelve o'clock point, it is positioned such that, under circumstances where the wheels 14 and 15 are of equal diameter, the chain 16 would inherently be in its naturally loosest position if the roller were allowed to contact the idler wheel. The ramp 50, however, holds the roller 22 out of contact with the wheel 15 at the twelve o'clock point and thus keeps the chain 16 tight in spite of the natural tendency of the chain to be loose. As the roller 22 starts to curve around from the twelve o'clock point, its movement would inherently tend to tighten the chain if the roller proceeded around a true arc from the twelve o'clock point. The cam surface 61, however, allows the roller to move gradually inwardly toward the idler wheel 15 and thus gradually reduces the natural tightness of the chain while still keeping the chain tight. The cam surface 61 ultimately allows the roller to smoothly move into contact with the idler wheel 15 and, because this wheel is smaller in diameter than the sprocket wheel 14, the chain 16 does not becomes so tight as to bind or break even though the roller 22 is in an angular position causing the chain to naturally assume its tightest condition.

A similar but reverse action occurs when each roller 22 approaches the six o'clock point on the idler wheel 15. As the roller begins approaching that point, it inherently would start to cause the chain 16 to loosen. The roller, however, encounters the cam surface 61 of the ramp 51 and is gradually moved outwardly from the idler wheel 15 so as to tighten the chain 16. By the time the roller has reached the six o'clock point, the cam surface 61 of the ramp 51 has cammed the roller outwardly sufficiently far from the idler wheel to cause the chain to remain tight even though the angular position of the roller is such as to otherwise cause the chain to be in its naturally loosest condition. The roller then encounters the straight surface 60 of the ramp 51 and moves in a straight line along that surface and the outboard surface of the inboard guide rail 25 at the front of the drive 10.

It should be understood that one roller 22 moves away from the twelve o'clock point on the idler wheel 15 at the same time another roller is approaching the six o'clock point. When the latter roller reaches the six o'clock point, yet another roller has reached the twelve o'clock point. The ramps 50 and 51, therefore, act in conjunction on the rollers to effect tightening of the chain when the rollers move to angular positions which otherwise would cause loosening of the chain. Also, the reduced diameter idler wheel 15 prevents the chain 16 from breaking or binding when the rollers are in contact with the wheel and are angularly positioned to cause the chain to be in its naturally tightest condition.

The compensation which is effected on the chain 16 in the area of the idler wheel 15 automatically prevents the chain from loosening and tightening in a cyclic manner as the rollers 22 pass around the sprocket wheel 14. Accordingly, it is not necessary to vary the path of the rollers around the sprocket wheel and thus the rollers may enter the pockets 40 in a regular manner to effect normal driving of the chain.

The compensation effected by the ramps 50 and 51 and by the reduced diameter idler wheel 15 enables the rollers 22 to move in a straight line until they reach the twelve o'clock point on the idler wheel and to resume straight line movement just upon reaching the six o'clock point. Accordingly, the rollers may remain in the rear guide channel 23 until they just start to curve around the idler wheel and they may enter the front guide channel 23 immediately upon reaching the six o'clock point. The chain links 17, therefore, are guided in such a manner that the links move with virtual silence and are not subjected to abrupt shock loads.

I claim:

1. A precision chain drive comprising a sprocket wheel and an idler wheel rotatable about spaced parallel axes, drive means for rotating said sprocket wheel, the periphery of said sprocket wheel being formed with angularly spaced pockets, an endless chain trained around said wheels, said chain being formed by an even number of pivotally interconnected links, rollers carried by said links and adapted to enter said pockets whereby said sprocket wheel drives said chain, and means for guiding said chain and causing opposite runs of the chain to travel along straight parallel paths as the runs move between said wheels, said precision chain drive being characterized in that the diameter of said idler wheel is smaller than the effective diameter of said sprocket wheel, first means for holding each roller out of engagement with the periphery of said idler wheel as the roller first starts to move out of a straight path and around the idler wheel, said first means enabling each roller to engage said idler wheel after the roller has moved a predetermined distance around the idler wheel, and second means for camming each roller out of engagement with said idler wheel after the roller has progressed around the idler wheel and a predetermined distance before the roller starts to move in a straight path.

2. A precision chain drive comprising a sprocket wheel and an idler wheel rotatable about spaced parallel axes, drive means for rotating said sprocket wheel, the periphery of said sprocket wheel being formed with angularly spaced pockets, an endless chain trained around said wheels, said chain being formed by an even number of links and by pivots which interconnect said links, rollers coaxial with said pivots and adapted to enter into said pockets whereby said sprocket wheel drives said chain, said precision chain drive being characterized in that the diameter of said idler wheel is smaller than the effective diameter of said sprocket wheel, first and second parallel guide surfaces extending between said wheels on generally opposite sides of the wheels and engaging the inboard sides of said rollers to cause opposite runs of said chain to travel along straight parallel paths as the runs move between said wheels, said first guide surface being located outwardly of a first line extending parallel to said first guide surface and tangent to a first point on said idler wheel, said second guide surface being located outwardly of a second line extending parallel to said second guide surface and tangent to a second point on said idler wheel, first means located adjacent said first tangent point and holding each roller out of engagement with the periphery of said idler wheel until the roller has moved a predetermined distance past said first tangent point, and second means located adjacent said second tangent point and camming each roller out of engagement with the periphery of said idler wheel a predetermined distance before the roller reaches said second tangent point.

3. A precision chain drive as defined in claim 2 in which said first means comprises a ramp having a straight surface which forms part of said first guide surface and having a curved surface which becomes coincident with the periphery of said idler wheel a predetermined distance past said first tangent point.

4. A precision chain drive as defined in claim 3 in which said second means comprises a cam having a curved surface which is coincident with the periphery of said idler wheel a predetermined distance ahead of said second tangent point and having a straight surface which forms part of said second guide surface.

* * * * *